Oct. 13, 1936.  R. L. OWEN  2,056,980
AIR CONDITIONING SYSTEM FOR VEHICLES
Filed March 25, 1933  3 Sheets-Sheet 1
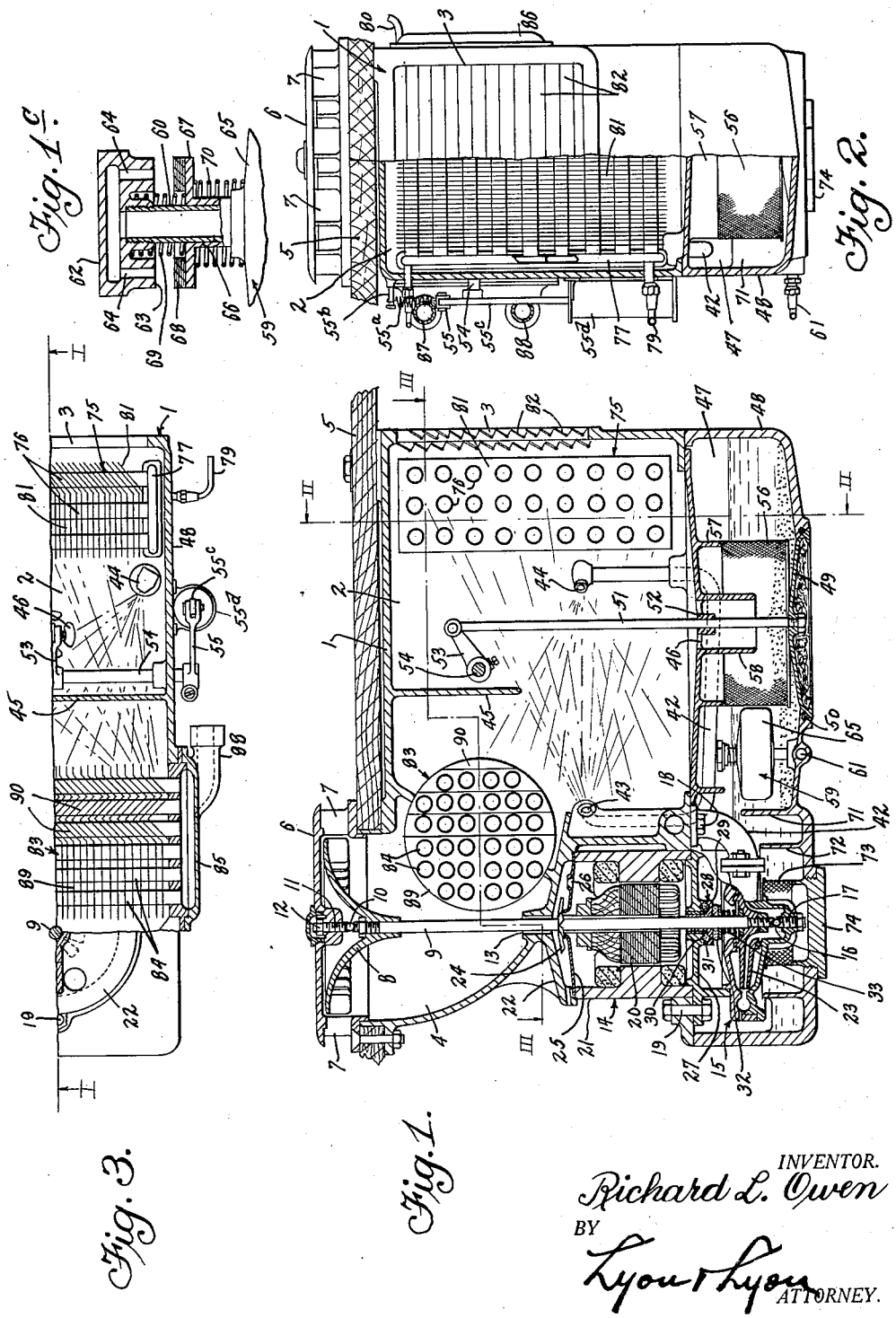
INVENTOR.
Richard L. Owen
BY
Lyon & Lyon
ATTORNEY.

Oct. 13, 1936.   R. L. OWEN   2,056,980
AIR CONDITIONING SYSTEM FOR VEHICLES
Filed March 25, 1933   3 Sheets-Sheet 2
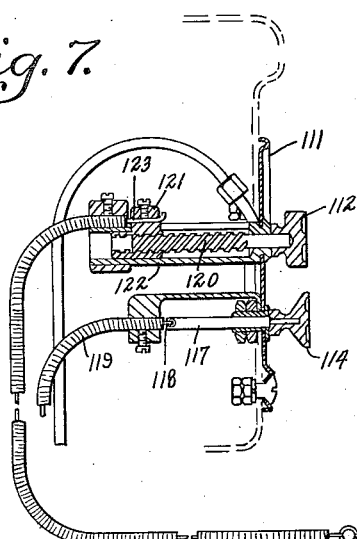
Fig. 7.
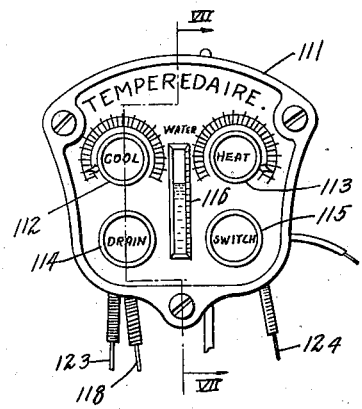
Fig. 6.
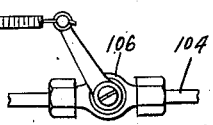
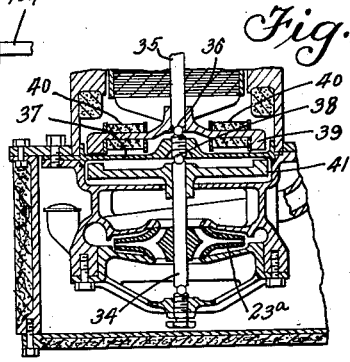
Fig. 1ª.
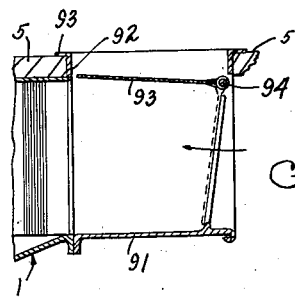
Fig. 1ᵇ.
Inventor
Richard L. Owen
By Lyon & Lyon
Attorneys.

Oct. 13, 1936.    R. L. OWEN    2,056,980
AIR CONDITIONING SYSTEM FOR VEHICLES
Filed March 25, 1933    3 Sheets-Sheet 3

INVENTOR.
Richard L. Owen
BY
Lyon & Lyon
ATTORNEYS.

Patented Oct. 13, 1936

2,056,980

UNITED STATES PATENT OFFICE 2,056,980

AIR CONDITIONING SYSTEM FOR VEHICLES

Richard L. Owen, Santa Monica, Calif.

Application March 25, 1933, Serial No. 662,695

8 Claims. (Cl. 257—7)

This invention relates to an air conditioning system for vehicles and particularly to systems adaptable for use on moving vehicles such as automobiles, motor buses and railway coaches.

An object of the invention is to provide practicable air conditioning equipment operable from the source of energy already available on the vehicle, namely, the lighting battery.

Another object is to provide a practicable system for vehicles for washing the air to be conditioned and then cooling it or heating it as necessary to bring it to a desired temperature.

Another object is to provide a practicable system for vehicles for humidifying air that is initially excessively dry, or for dehumidifying air that is excessively humid, and, at the same time, heating or cooling the air as is necessary to bring it to a desired temperature.

Other objects and features of the invention will be apparent from the following detailed description, which refers to the drawings.

In the drawings:

Figure 1 is a side elevation view of an air washing and tempering unit in accordance with the invention.

Figure 1—a is a side elevation view of a modified form of construction of the pump and motor of the unit shown in Figure 1.

Figure 1—b is a side elevation view of an air inlet control valve and passage that may be used in connection with the unit shown in Figure 1.

Figure 1—c is a detail view of the construction of the float valve in the unit of Figure 1.

Figure 2 is an end elevation view of the same device with a portion of the apparatus cut away to show the interior construction.

Figure 3 is a plan view of a portion of the unit shown in Figure 1, with portions of the apparatus cut away to show the interior construction.

Figure 6 is a front view of a dash instrument for controlling the air conditioning system for automobiles illustrated in Figures 4 and 5.

Figure 7 is a central, elevational view of the dash instrument shown in Figure 6, taken in the plane VII—VII of Figure 6.

Figure 5:
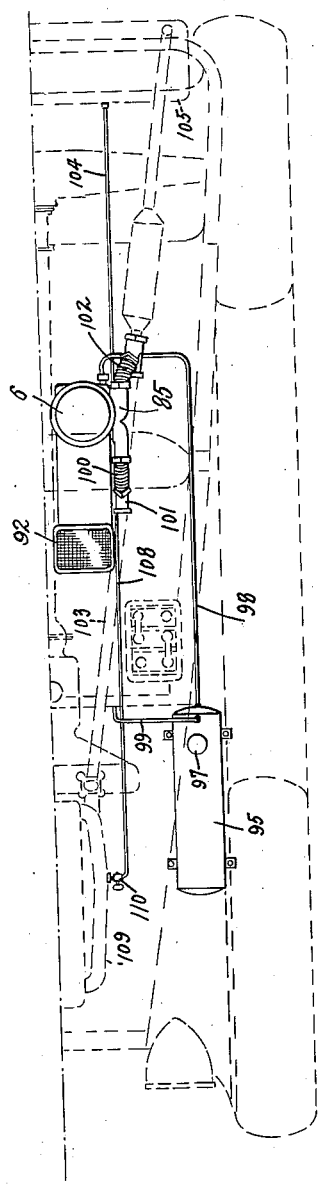
Figure 5 is a top view of a portion of the automobile and air conditioning equipment shown in elevation in Figure 4.

The present invention involves a complete air conditioning system applicable with certain modifications to automobiles, motor buses, and railway coaches. The system for each of these different vehicles includes one or more air washing and tempering units, that is substantially the same in each system, and constitutes one of the most important elements of each system. This unit will, therefore, first be described in detail and then its application to an automobile will be described.

Referring to Figure 1, the air washing and tempering unit comprises a case 1 defining an air washing chamber 2 having an air inlet opening 3 on one side and an air outlet opening or discharge conduit 4 on the opposite side, air being drawn in through the inlet opening 3, washed and heated or cooled, as necessary, to bring it to a desired temperature, within the chamber 2, and discharged through the discharge conduit 4 into the vehicle. The unit is preferably mounted immediately below the floor of the vehicle on which it is used, the floor being shown at 5, and the discharge conduit 4 is provided at its upper end with a turret 6 projecting slightly above the floor 5 of the vehicle for delivering air into the vehicle.

The turret 6 is closed at its upper end and is provided with a plurality of peripheral openings 7 through which the air which has been drawn through the washing and conditioning chamber 2 is forcibly discharged either radially or tangentially into the vehicle by a cylindrical blower 8 positioned within the turret 6.

The blower 8 is mounted upon a vertical shaft 9 which is supported against both axial and radial movement at its upper end from the top of the turret 6. Thus, the upper end of shaft 9 is hollow and bears against the ball 10 which fits into the hollow, lower end of a bearing screw 11 threaded into the top of the turret and secured against turning by a locknut 12. Shaft 9 extends down below the blower 8 through a passage 13 provided therefor in the wall of the discharge conduit 4 through an electric motor 14 and a water pump 15 and is supported at its lower end upon a ball bearing 16 which in turn is supported in the hollow, upper end of a screw 17 threaded into the frame of the pump 15. The frame of pump 15 is in turn secured rigidly to the case 1, as by bolts, two of which are shown at 18 and 19, respectively.

The electric motor 14 comprises a rotor 20 which is rigidly mounted on the shaft 9 for rotation therewith and a housing 21 which constitutes a portion of the field magnet structure of the motor in addition to a supporting and enclosing unit therefor. The upper end of the motor housing 21 is closed by an end wall 22 which is formed integrally with the wall of the discharge conduit 4. At its point of passage through the pump 15, shaft 9 is rigidly secured to the rotor 23 of the pump (which is of the centrifugal type) so that both the blower 8 and the rotor 23 of the pump 15 are rotated by the rotor 20 of the motor 14 when the latter is supplied with energizing current. The motor 14 is designed to operate from the particular source of electric energy operable on the vehicle on which the unit is used. In the case of automobiles, and motor buses, the source of energy employed is the usual 6-volt or 12-volt battery provided for starting and lighting purposes. On a railway coach the source of energy would be the usual battery for lighting the car. This source usually has a potential higher than 6-volts so that the motors used in units for railway coaches must be wound for a higher potential than the motors of units to be used in automobiles and motor buses.

With the rotor 20 of the electric motor the blower 8 and the impeller 23 of the pump all mounted on the same shaft 9 but in different compartments, it is necessary to provide special means for preventing moisture from the pump chamber or from the air discharged through the discharge conduit 4 from reaching the electric motor 14. To prevent any moisture that might run down shaft 9 from the discharge conduit 4 from getting into the motor, a disc 24 is mounted upon the shaft 9 immediately below the passage 13, and a false top 25 for the motor housing is positioned immediately below the disc 24, this false top 25 having a central passage therein for the shaft 9. The disc 24 is preferably serrated adjacent its periphery and the portions between the serrations bent to constitute fan blades for creating a draft down about the shaft 9 through passage 13 and through an opening 26 in the end plate 25 into the motor for cooling the latter. The edges of the passage 26 are bent upwardly, as shown, to prevent any water which accumulates on the top of plate 25 from running through the passage 26 into the motor.

In operation, the rapid rotation of the disc 24 throws any particles of moisture falling down along the shaft 9 out over beyond the passage 26 where it accumulates around the periphery of the plate 25 and drains back into the air conditioning chamber 2 through a duct (not shown in the drawings).

To prevent any water from the pump chamber working up into the electric motor, it is necessary to provide a fluid-tight seal between the shaft 9 and the top wall 27 of the pump chamber, through which the shaft passes. To provide such a seal, a bushing 28, having an outwardly projecting flange 29 at its lower edge, is loosely fitted about the shaft 9. At the lower edge of this passage in the wall 27, there is provided an annular groove 30 and juxtaposed to groove 30, upon the upper face of the outwardly extending flange 29 on bushing 28, is a similar annular groove and a ring 31 of graphite or of packing material impregnated with graphite, or other anti-friction material, is positioned between the grooves. To support the bushing 28 against the ring 31, a washer 32 of resilient material, such as rubber, is positioned about the shaft 9, immediately below the bushing 29, and is maintained in contact with the lower face of bushing 29 by a spiral spring 33, the lower end of which rests upon the top face of the impeller 23 in a recess provided therefor. The rubber washer 32 fits snugly about the shaft and when compressed by the spring 33 it expands inwardly to fit even more tightly about and seal with the shaft.

The construction described, has been found in practice to be very successful in that it prevents any leakage of the water from the pump chamber up into the electric motor and, at the same time, offers very little frictional resistance to the rotation of the shaft 9. This is very important for the reason that the current which it is permissible to draw from the lighting battery of an automobile or motor bus is limited, and the blower, pump and motor assembly must have an extremely high over-all efficiency if it is to be operated satisfactorily from the usual lighting battery.

An alternative form of construction for providing a water-tight seal between the pump chamber and electric motor is shown in Figure 1—a, in which the impeller 23—a of the pump is mounted upon a shaft 34 independent of the shaft 35 upon which the rotor of the motor and the blower are mounted. Thus, the lower end of the motor shaft 35 is supported upon a ball bearing 36 immediately below the motor which is supported by a thin solid end wall 37 of non-magnetic metal. The upper end of the pump impeller shaft 34 which is in alignment with the motor shaft 35, is also supported by a ball bearing 38 from the partition 37 separating the pump from the motor.

In the arrangement shown in Figure 1—a, torque is transmitted from the motor shaft 35 to the pump impeller shaft 34 through the separating partition 37 by magnetically coupling the two shafts. Thus, an electromagnet 39 is rigidly secured to the lower end of the motor shaft 35 and is energized by a pair of coils 40 which receive energizing current from the source used to operate the motor, through the brushes and the commutator of the motor. The electromagnet 39 is provided at its outer ends with a pair of pole pieces which face against the partition 37 of non-magnetic material. Positioned upon the upper end of the pump impeller shaft 34 is a cross piece 41 of iron, or other magnetic material, which is provided at its opposite ends with a pair of upwardly facing pole pieces which revolve very close to the partition 37.

In operation, the electromagnet 39 is energized by current supplied to the coils 40 and the magnetic circuit of the electromagnet is completed through the non-magnetic partition 37 and the iron cross piece 41. As a result of the magnetic attraction exerted between the faces of the pole pieces of the electromagnet and the pole pieces of the cross bar 41, the latter is rotated with the electromagnet and hence the pump impeller shaft is rotated in unison with the motor shaft 35. The method of coupling the pump to the motor, shown in Figure 1—a, has been found to be very efficient and is less apt to cause undesired friction loss in the unit than the packing system shown in Figure 1, although the latter is quite satisfactory for some installations.

The pump 15 supplies water under pressure through the water discharge conduit 42 to a plurality of nozzles 43 and 44 positioned in the air conditioning chamber 2.

I have found that for maximum efficiency, it is desirable to use two sets of these nozzles, the nozzles 43 being positioned adjacent the discharge side of the chamber 2 and discharged against the current of air flowing through the discharge chamber, and the nozzles 44 being positioned adjacent the intake side of the conditioning chamber and discharging in the opposite direction. A baffle 45 is extended down from the top wall of the air conditioning chamber to force the air entering through the inlet opening 3 through the spray produced from the nozzles 43 and 44. These nozzles produce a very thick mist of finely divided water in the space immediately below the baffle 45, which effectively washes and humidifies the air passing through the chamber.

The water from the sprays, together with the dirt and dust from the air, falls to the bottom of the chamber 2 and passes down through a central passage 46 into a sump 47 positioned below the chamber 2. This sump 47 has been shown formed by a lower case 48 secured to the bottom of the case 1.

When the device is in operation in a region where there is much dust, the dust and dirt which is removed from the air by the water spray accumulates in the sump 47 immediately below the discharge passage 46 as a heavy sludge or mud and to provide for the discharge of this sludge or mud as it becomes necessary, a mud valve 49 is provided in the bottom of the sump immediately below passage 46 in the bottom of the chamber 2. The valve 49 is of substantial diameter and is normally maintained in sealing engagement with the edges of the opening which it seals in the bottom of the sump cage 48. Thus the edges of valve 49 may be ground to fit against a ground seat in the case 48 and a gasket 50 of resilient material such as rubber, mounted in a groove provided therefor in the seat to insure a fluid-tight joint. The valve 49 is supported upon a valve stem 51 which extends up through a guide 52 provided therefor in the floor of the chamber 2 and is pivotally secured at its upper end to an arm 53 which is mounted upon a shaft 54 (Figure 3) which extends through the side wall of the chamber 2 to the exterior thereof and has mounted upon its outer end, exterior of the chamber, an arm 55.

The valve 49 is opened by shifting the arm 55, exterior of the unit, to lower the valve stem 51 and the valve 49. Lowering of the valve 49 causes a sudden rush of water from the sump 47 which carries with it any accumulation of mud or sludge thereabove. Obviously, the valve need be opened only momentarily to discharge the accumulated sludge.

The valve is normally maintained in closed position by a spring 55—a extending from the end of arm 55 (Figure 2) to a pin 55—b projecting from the side of the case 1. The valve may be opened either by a mechanical connection, such as a Bowden cable extending to a convenient control point or by remote electrical control. The unit shown in Figure 2 is designed for electrical control and to this end the outer end of arm 55 is pivotally connected to a rod 55—c extending down and connecting to the plunger of a solenoid 55—d. Energization of the solenoid 55—d pulls the rod 55—c down to open the valve and upon de-energization of the solenoid 55—d the valve is restored to closed position by the spring 55—a.

To localize the deposit of sludge as much as possible immediately above the valve 49, a cylindrical screen 56 is provided, this screen being supported from a downwardly extending flange 57 on the floor of the chamber 2. A downwardly extending flange 58 is also provided within the screen 56 and below the discharge passage 46 for preventing water being washed back into the chamber and to dampen liquid surges occasioned by movement of the vehicle.

As the device is operated, more or less water is lost by evaporation of the air being conditioned, the quantity of water lost depending upon the dryness of the outside atmosphere. In any event, it is necessary to add additional water to maintain a desired level within the sump 47 and a float valve 59 is provided for admitting water as necessary from any suitable source of supply.

Referring to Figure 1—c, it will be observed that the float valve, designated generally at 59 in Figure 1, comprises a hollow vertical stem 60 connected at its lower end to a water supply conduit 61, which is formed integrally within the floor of the sump 48. The upper end of the hollow stem 60 carries a hollow cap 62 which is provided with a ground lower face 63 having discharge apertures 64 therein communicating with the interior of the hollow stem 60.

Surrounding the stem 60 is a hollow metal float 65 and also positioned about the stem 60 above the float 65 is a loosely fitting bushing 66 having an outwardly extending flange 67 on its upper end which supports a washer 68 of resilient material which, when the bushing 67 is moved upwardly, closes and seals the orifices 64 in the lower face 63 of the cap 62, thus preventing any flow of water therefrom.

A spiral spring 69, extending between the cap 62 and the bushing 67, and a spiral spring 70 positioned between the flange 67 of bushing 66 and the upper face of the float 65, serves to resiliently support the bushing 66 vertically between the cap 62 and the float. When the float 65 is in its lowermost position, as occurs when the level of the water within the same falls substantially below the top of the float, the upper spring 69 forces the washer 68 away from the orifices 64 to permit a flow of water therefrom to fill the sump. When the water in the sump rises sufficiently to lift the valve 65 the latter, through spring 70, forces the bushing 66 and the washer 68 upwardly into engagement with the lower face 63 of the cap 62 to shut off the flow of water. Spring 69 is relatively weak as compared to spring 66 so that the buoyancy of the float is sufficient to close the valve.

I have found that a float valve of the particular type disclosed is highly desirable in a unit of the type described mounted upon a moving vehicle, since the movement causes the water in the sump to surge back and forth and if the valve were rigidly attached to the float it would be opened and closed more or less continually with the agitation of the water in the sump.

The float 59 (referring again to Figure 1), is preferably adjusted to maintain a water level in the sump 47 substantially above the lever of the impeller of the pump 23 so that the pump is always properly primed. To prevent the water from surging back and forth from the pump to the sump and to prevent mud and sludge from entering the pump to as great an extent as possible, baffles 71 and 72, extending upwardly from the floor of the pump chamber, are provided, and, to further prevent foreign matter from being drawn into the pump, a screen 73, surrounding the intake passage of the pump, is provided. This intake screen 73 is cylindrical in shape and is secured at its lower edge to a plug 74 screwed into the bottom of the pump chamber. By unscrewing the plug 74, the screen 73 may be cleaned and any accumulation of sediment about the screen removed in a single operation.

Under most conditions of operation, the air to be conditioned will be sufficiently cooled during its passage through the chamber 2 by evaporation of water from the sprays during the washing of the air. However, during extremely humid weather it may be necessary to initially chill the air to precipitate excessive moisture therefrom and to this end a refrigerant evaporator 75 is positioned in the chamber 2 immediately adjacent the inlet opening 3. This refrigerant evaporator 75 comprises a plurality of horizontal tubes 76 of metal of high thermal conductivity which communicate at opposite ends with fluid-tight vertically disposed headers or drums 77 (Figures 2 and 3), only one of which is shown in the drawings. The drum 77 that is shown is provided with an inlet connection 79 for admitting a low boiling point refrigerating liquid thereto, which liquid evaporates in the drum 77, and the tubes 76 of the evaporator, and then passes into the other drum from which it is exhausted through an exhaust passage 80 connected thereto. The evaporation of the refrigerant within the tubes 76 cools those tubes substantially below the temperature of the air passing therearound from the air inlet opening 3 and the cooled tubes absorb heat from the air, thus reducing its temperature. To increase the heat transfer efficiency of the tubes 3, a plurality of thin metal radiating fins 81 are provided, these fins being soldered or otherwise joined to the outside surface of the tubes 76 to provide good thermal conductivity between the tubes and the fins.

It will be observed from an inspection of Figure 1 that the spray from the rear nozzles 43 is directed against the refrigerant evaporator 75, and, to prevent water from the spray passing through the evaporator and out the air inlet opening 3, the fins 81 are deflected at their front ends, as shown in Figure 3. As so deflected, the fins 81 eliminate straight line passages through the evaporator, and all the water from the spray-producing nozzle 43, striking the evaporator, impinges upon the fins and is drained thereoff down to the floor of the washing chamber 2. As an additional guard against the discharge of any water through the air intake opening 3, the latter is provided with downwardly and inwardly projecting louvers 82.

It will be seen that the evaporator serves in a double capacity in that it functions as a means of cooling both the water and the air stream. The heat transfer between the refrigerant and the air is also improved by the wetting of the evaporator fins.

Except during extremely hot, humid weather, the refrigerant evaporator 75 need not be used and is rendered inoperative by cutting off the supply of refrigerating liquid to the inlet 79.

During cool weather, or extremely dry weather, the air being conditioned may be chilled by evaporation of water from the sprays in chamber 2, (these sprays are always employed even in the coldest weather for the purpose of washing the air) below the temperature which it is desired to maintain in the vehicle. It is, therefore, sometimes necessary to heat the air after it has been washed, and to this end a heater 83 is positioned between the washing chamber 2 and the discharge conduit 4. This heater 83 comprises a series of finned tubes 84 extending horizontally between end drums 85 and 86.

The drum 86 connects all of the tubes 44 together at one end, but the drum 85 is divided vertically by a horizontal partition into two compartments, the lower compartment of which communicates with half the tubes and the upper compartment of which communicates with the remaining tubes. The upper compartment of drum 85 is provided with an inlet opening 87 for admitting heating fluid thereto and the lower compartment of the drum 85 is provided with an outlet connection 88 from which the heating fluid is exhausted after its passage through the tubes 84.

Where the unit is installed on an automobile or motor bus, the heating fluid employed may be either water from the cooling system of the engine or exhaust gases from the engine; when the unit is installed in a railway coach, steam from the train line will be employed as the heating fluid.

To provide most efficient heat transfer between the tubes 84 and the air to be conditioned, a plurality of vertical fins 89 are provided, these fins being soldered or otherwise secured to the tubes 84 to insure good thermal conductivity therebetween. These fins 89 are bent, as shown at 90 in Figure 3, to eliminate any straight line air passages through the heater 83 and trap water directed against the heater from the forward spray nozzles 44 and prevent its passage into the discharge conduit 4.

The bent fins 89 also knock considerable entrained moisture out of the air passing therethrough, which moisture, when the tubes 84 are not heated, drains back into the washing chamber 2. Of course, when the tubes 84 are heated, a substantial portion of the water impinging thereon will be vaporized by the heat and will pass on into the vehicle with the air.

Thus, under winter conditions, humidification is attained together with heating, and so preventing the freezing of the washing water.

The air conditioning unit disclosed in Figure 1 is provided merely with an inlet opening 3 for receiving air directly from the surrounding atmosphere. In some instances, it is desirable to recirculate air from the vehicle through the unit. To this end, an air inlet valve, such as is shown in Figure 1—b, may be positioned over the inlet opening 3.

Referring to Figure 1—b, this valve comprises a casing 91 which is secured to the case 1 of the air conditioning unit and is provided with a forward open end communicating directly with the surrounding atmosphere and an open top communicating with the air within the vehicle. Thus, the case is shown as comprising an upwardly extending conduit 92 adapted to be positioned in an opening therefor in the floor of the vehicle and having an outwardly extending flange 93 resting upon the edges of the aperture in the floor for supporting a portion of the weight of the casing 91.

The upper end of the conduit 92 is preferably provided with an open grating to prevent objects in the car from falling therethrough. Positioned within the casing 91 is a flap valve 93 which is hinged at one edge to a rod 94 positioned adjacent the forward edge of the conduit 92 and the upper edge of the forward opening in the case. The valve 93 may be rotated by rotating the rod 94 upon which it is mounted, from a lower position in which the opening to the surrounding atmosphere is completely closed to an upper position in which the opening into the vehicle is completely closed. By moving the valve 93 intermediate its two end positions, some air may be recirculated from the vehicle and additional air simultaneously drawn in from the surrounding atmosphere. Valve 93 may be controlled by an arm attached to one end thereof outside of the casing 91 (not shown), which arm may be connected by a mechanical control system to a control handle at any convenient point.

Figure 4:
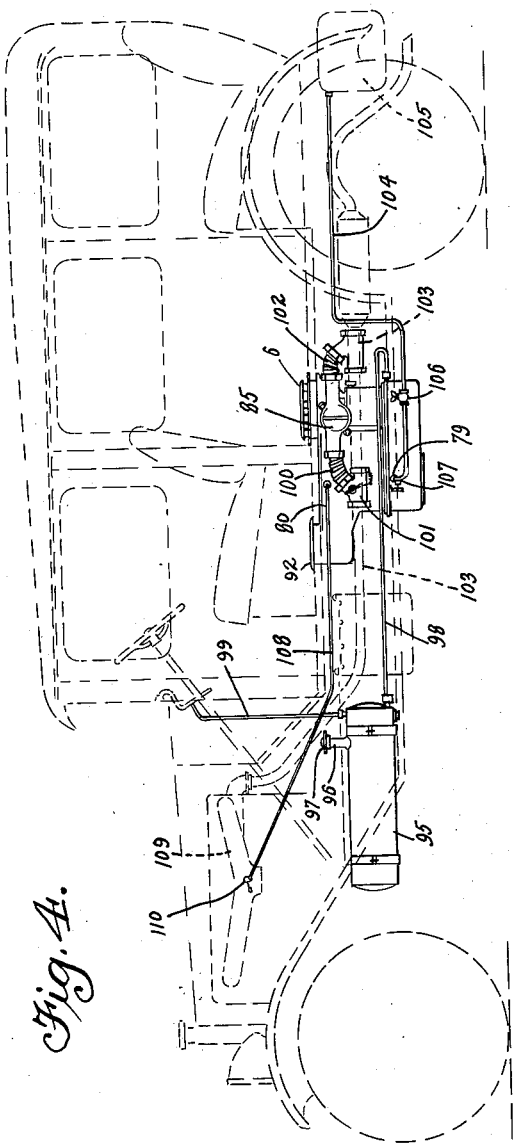
Figure 4 is a side view of an automobile showing the manner of installation of an air conditioning system in accordance with the invention.

Referring to Figures 4 and 5, I have shown, schematically, a complete installation including an air conditioning unit of the type described, on an automobile.

Thus an air conditioning unit, in accordance with Figures 1 and 1—b, is shown mounted below the floor of the automobile with the air discharge turret 6 and the air inlet conduit 92 projecting through the floor. A water supply tank 95 for supplying water to the sump of the air washing unit is shown mounted to the frame of the automobile forwardly of the unit immediately below and within the rear portion of the front fender of the automobile. This tank 95 preferably has a capacity of several gallons of water, as considerable water is evaporated by the conditioning unit during hot, dry weather. The tank 95 is provided with a filler opening 96 projecting through the fender or apron of the car, to facilitate filling, which is normally closed by a filler cap 97. Water is supplied from tank 95 through a pipe 98 to the float valve in the sump of the air conditioning unit. The tank 95, the pipe 98 and the outer case of the air conditioning unit are preferably enclosed in a coating of heat-insulating material to keep the water as cool as possible during hot weather and to prevent unnecessary cooling or even freezing of the water during cold weather.

The amount of water contained in the tank may be indicated by a manometer mounted on the dash of the automobile and actuated by a conventional bell terminal in the tank which terminal may be connected by a pipe 99 to the manometer on the dash.

As previously indicated, heating fluid for the heater 83 of the air conditioning unit may comprise either exhaust gases from the engine of the automobile or heated water from the engine. In the installation shown in Figures 4 and 5, connections for supplying exhaust gas to the heater are provided. Thus I have shown a connection 100 extending from a valve 101 in the exhaust pipe 103 to the intake compartment of the drum 85 on the heater 83 and a connection 102 from the outlet compartment of drum 85 back into the exhaust pipe of the automobile at a point to the rear of the valve 101. The valve 101 may be a small, flap valve adapted to close the opening into the connection 100 in one position, and to close the exhaust pipe back of the connection when in the other position to divert the exhaust gases through the connection 100. This valve 101 may be controlled from the dash of the automobile in a manner to be described later.

When the unit is installed in an automobile, I prefer to use gasoline from the usual gasoline tank of the automobile as the refrigerating liquid in the refrigerant evaporator 75.

Thus I have shown in Figures 4 and 5 a pipe 104 extending from the usual gasoline tank 105 of the automobile through a control valve 106 and an expansion valve 107 to the inlet connection 79 of the refrigerant evaporator. Gasoline is admitted to the refrigerant evaporator from the tank 105 substantially at atmospheric pressure and to promote evaporation of the gasoline within the evaporator it is desirable, if not absolutely necessary, to maintain the pressure within the evaporator at a pressure substantially less than atmospheric. To this end, and to dispose of the vaporized gasoline, the outlet connection 80 of the evaporator is connected by a pipe 108 to the intake manifold 109 of the engine of the automobile through a valve 110.

In operation, the expansion valve 107 is adjusted to permit a desired slow flow of gasoline into the refrigerant evaporator and the valve 110 is open to maintain the pressure in the evaporator substantially the same as that in the intake manifold 109. The light fractions of the gasoline so admitted through the expansion valve 79 immediately boil in the evaporator under the reduced pressure created therein, reducing the temperature of the mass of gasoline, and substantially lowering the temperature of the evaporator tubes and fins and chilling the washing water and air which is constantly circulating over the outer surfaces of the evaporator. The heat required to vaporize the refrigerant is abstracted from both the air and the water and the rate of heat transfer is increased due to the wetting of both the external and the internal surfaces of the evaporator.

The gasoline, after being at least partially vaporized in the refrigerant evaporator 75, is drawn into the intake manifold of the engine, and thence into the engine and burned.

Obviously the evaporator may be served with liquid refrigerant other than gasoline by the installation of a small compressor which may be driven from the engine or transmission of the vehicle, and the further addition of a condenser in the high pressure line between the compressor and the evaporator.

The system shown in Figures 4 and 5 is preferably controlled entirely from a control panel on the dash of the automobile, and one of such control panels is shown in Figures 6 and 7. Thus, referring to those figures, I have shown an ornamental plate or control panel 111 having four control knobs 112, 113, 114 and 115, respectively, and the manometer 116 previously referred to in connection with the water supply tank 95.

The knob 114, which may be labeled "Drain" is provided for the purpose of operating the mud valve 49, and is connected to a shaft 117 which, in turn, is connected to the end of a flexible cable 118 enclosed in a flexible casing 119, and connects at its opposite end to the arm 55 (Figure 3). When the knob 114 is pulled out, it opens the valve 49 against the pull of the spring 55—a and when the knob 114 is released the spring automatically restores the valve to closed position. The knob 112 controls the supply of refrigerant (gasoline in the case) to the refrigerant evaporator 75 in response to rotation of the knob. Thus, the knob is secured to a screw shaft 120 which cooperates with a nut 121 mounted to slide longitudinally within a case 122. The nut 121 is provided with a projection on the upper portion thereof through a slot in the case 122 which is attached to one end of a flexible wire or cable 123, the other end of which is secured to the arm of the control valve 106 in the gasoline line 104. Since the nut 121 is prevented from rotating, rotation of the knob 112 and the screw shaft 120 shifts the nut forward or rearward to open or close the valve 106 depending upon the direction in which the knob is turned.

Although the manual control of the refrigerant provided by the knob 112 is satisfactory, it may be desirable, in some instances, to automatically control the opening and closing of the valve 106 by a wet and dry bulb thermostat of standard design mounted within the car. With this form of control, it is only necessary to provide a solenoid for actuating the valve 106 and a thermostat circuit of any well known type for energizing and de-energizing the solenoid in response to humidity variation above and below a predetermined value.

The knob 113, on the control panel 111, operates the valve 101 in the exhaust pipe of the car for controlling the admission of exhaust gases to the heater 85 of the air conditioning unit. The knob 113 operates the valve 101 through a flexible cable 124 in exactly the same manner as the control knob 112 actuates the gasoline valve 106. Of course, if desired, the valve 101 may also be automatically controlled by a solenoid under the control of a thermostat in the automobile.

The switch 115 is simply a conventional electric switch for closing the circuit (not shown) from the lighting and starting battery of the automobile to the electric motor of the air conditioning unit.

In operation, during extremely cold weather the supply of gasoline to the refrigerant evaporator will, of course, be cut off and the hot exhaust gases will be admitted to the heater to raise the temperature of the washed air to a desired point. Ordinarily, in hot weather, the exhaust gases will be by-passed around the heater 85 and the gasoline may or may not be admitted to the refrigerant evaporator, depending upon whether the atmosphere is or is not sufficiently dry to secure the necessary cooling by evaporation of the wash water. In some instances, where the humidity is very high but the temperature not excessive, it may be desirable to operate the refrigerant evaporator to chill the air and condense excessive moisture therefrom and then to supply a small amount of exhaust gas to the heater 85 to restore the air to a comfortable temperature.

Although as shown in Figures 4 and 5 exhaust gas is utilized for heating purposes, it is obvious that water from the water jacket of the engine may be used to supply the necessary heat. If water is used as the source of heat, connections will be made from the inlet and outlet compartments of the drum 85 to the engine water jacket at the point of highest temperature thereof and to the lower end of the automobile radiator, respectively. This is the usual manner of connecting hot water automobile heaters and it is unnecessary to show the specific connections.

In ordinary operation, when the automobile is running, it is desirable to close the air intake opening leading from the vehicle through the intake conduit 92, so that all the air forced into the car through the discharge turret 6 comes from the atmosphere outside the car. The blower of the air conditioning unit delivers a substantial quantity of air at appreciable pressure so that if all the windows of the automobile are closed, the pressure within the automobile is appreciably greater than the pressure of the surrounding atmosphere. This is advantageous in that leakage of uncleaned air, dust or fumes through the various cracks and crevices of the car body into the car is prevented, the higher pressure within the car causing a continuous circulation of air out of the car body through the cracks and crevices. Of course the volume of air delivered to the car by the air conditioning unit is limited by the rate at which air can escape from the car body and it may be desirable, in some instances, to open one or more windows in the car a certain amount to increase the circulation of air through the car from the air conditioning unit.

It is desirable, in extremely cold weather, to recirculate air through the air conditioning unit from the automobile through the intake conduit 92, to a certain extent at least, to avoid the necessity of heating large quantities of extremely cold air from the surrounding atmosphere.

Having fully described the preferred embodiment of this invention, it is to be understood that I do not limit myself to the exact construction herein set forth, which may obviously be varied in detail without departing from the spirit of this invention, but only as set forth in the appended claims.

I claim:

1. An air conditioning unit for vehicles comprising a case defining a chamber having an air inlet and outlet openings in opposite sides thereof, means for circulating air through said chamber, a nozzle for producing a water spray in said chamber, a reservoir below said chamber constituting a sump for water discharged from said port, a discharge port in the floor of said chamber leading into said sump, a mud valve in the floor of said sump below said discharge port, and a vertically disposed baffle in said sump concentrically positioned about said discharge port and extending downwardly therebelow a substantial distance for directing sediment toward said mud valve and reducing surging of water from the sump into said chamber.

2. An air conditioning unit for vehicles comprising a case defining a chamber having air inlet and outlet openings in opposite sides thereof, means for circulating air through said chamber, a nozzle for producing a water spray in said chamber, a discharge port in the floor of said chamber, a reservoir below said chamber constituting a sump for water discharged from said port, a mud valve in the floor of said sump below said discharge port, and a screen in said sump surrounding said discharge port and extending down from the floor of said chamber to a level adjacent the floor of said sump.

3. An air conditioning unit for vehicles comprising a casing defining a chamber having air inlet and outlet openings in opposite sides thereof, means for circulating air through said chamber, a nozzle for producing a water spray in said chamber, a discharge port in the floor of said chamber, a reservoir below said chamber constituting a sump for water discharged from said port, a rotary pump submerged in water in said sump and having its driving shaft extending vertically thereabove, means above said sump for rotating the shaft, means for conveying water discharged from said pump to said nozzle, and a baffle wall between said pump and said chamber discharge port, said wall extending from the floor of the sump to a level slightly below the normal water level in the sump.

4. An air conditioning unit for motor vehicles comprising a casing defining a chamber having an air inlet at one end and an air outlet at the other end, said casing defining an upwardly curved discharge passage connecting with said outlet, a blower mounted on a vertical shaft in said passage, said shaft extending downwardly below the blower through an aperture provided therefor in the wall of said discharge passage, a motor positioned below said passage and exterior of said chamber having its rotor secured to said shaft, said motor comprising an upper end wall having an upwardly flanged orifice for said shaft, and disc means on said shaft above said end wall for throwing any water flowing down said shaft out beyond said flanged surface to prevent its entry into said motor.

5. In an air conditioning unit comprising an air conditioning chamber, a sump therebelow for containing water, a nozzle for producing a water spray in said chamber, a rotary pump in said sump for supplying water under pressure from said sump to said nozzle, said pump having a vertical shaft extending thereabove, and a motor on said shaft above said sump, a wall separating said sump and motor having an aperture for said shaft forming a loose fit about said shaft, a flange on the lower side of said wall surrounding said shaft and having an annular groove in its lower face, a bushing on said shaft comprising an outwardly extending flange, the upper face of which is juxtaposed to the lower face of said flange on said wall, said upper face of the flange on said bushing also having an annular groove therein, a ring of packing material interposed between said flanges and lying in said annular grooves, a washer of resilient material positioned around said shaft below said bushing, a washer of rigid material positioned about said shaft below said resilient washer, a collar secured to the shaft below said last washer, and a spiral spring between said collar and said last washer for forcing the latter upwardly to compress said resilient washer against the lower face of said bushing and to deform the resilient washer inwardly about said shaft, whereby it seals with both the shaft and the bushing.

6. In an air conditioning unit, an air conditioning chamber, a sump for receiving water draining from said chamber, a nozzle for producing a water spray in said chamber, a rotary pump in said sump for supplying water under pressure from said sump to said nozzle, said pump having a vertical shaft rotatably supported within said sump, an electric motor positioned above said pump and having a shaft in alignment with the shaft of said pump, a wall of nonmagnetic material separating said pump and electric motor and constituting a wall of said sump, a crossarm of paramagnetic material secured to said pump shaft immediately below said nonmagnetic wall and magnetic means secured to said motor shaft having pole pieces immediately above said nonmagnetic wall and opposite said crossarm whereby said pump and motor shafts are coupled together by the magnetic attraction between said magnet and said crossarm for simultaneous rotation.

7. An air conditioning unit comprising a case defining an air conditioning chamber having an inlet opening adjacent the top of one side wall, a discharge opening juxtaposed to said inlet opening on the opposite side of said chamber, said discharge conduit extending laterally and then upwardly from said chamber and terminating in a discharge turret positioned substantially completely to one side of said chamber, a fan in said turret supported on a vertical shaft extending down through the wall of said discharge conduit, said case also defining a sump positioned below said chamber and extending laterally therefrom to a point substantially below said discharge turret, a rotary pump positioned in said sump with its rotor in alignment with said shaft, a motor positioned exterior of said chamber and between said discharge conduit and said extended portion of the sump with its rotor in alignment with said first shaft and said pump rotor, means coupling said shaft to said motor rotor and pump rotor so that they rotate as a unit, a vertical baffle in said chamber extending downwardly from the top thereof between said inlet and discharge passages to direct air circulating through said chamber into the lower part of the chamber, heat-transfer means positioned in said chamber adjacent to said opening and in the path of air entering said chamber through said inlet opening, spray nozzles supplied with water under pressure from said pump positioned in the wall of said chamber below said discharge conduit to direct sprays through said chamber toward said inlet opening, and baffle means in said inlet and discharge openings for preventing the escape of water from said chamber while permitting the passage of air.

8. An air conditioning unit for vehicles comprising a casing defining an air conditioning chamber having an air inlet opening in one side wall thereof and an air outlet opening in an opposite side wall thereof, an outwardly and upwardly directed discharge conduit leading from said air outlet, a vertical shaft having a blower fan on the upper end thereof and positioned in said discharge conduit, said shaft extending down through the wall of said discharge conduit, a motor positioned below said blower and exterior of said conduit and casing, said motor having a rotor element in alignment with and coupled to said shaft, a water sump positioned below said air conditioning chamber and extending therebeyond to a point below said motor, said sump including a wall member separating the sump from the motor, and a rotary water pump positioned below said motor in said sump having a rotor in alignment with and coupled to said shaft, whereby said motor is mounted intermediate said blower and pump but exterior of both the conduit in which the blower is positioned and the sump in which the pump is positioned, said blower functioning to circulate air through said conditioning chamber and said pump functioning to circulate water to said conditioning chamber.

RICHARD L. OWEN.